3,756,940
SIMULTANEOUS PRODUCTION OF AROMATIC HYDROCARBONS AND ISOBUTANES
George R. Donaldson, Barrington, Ill., assignor to Universal Oil Products Company, Des Plaines, Ill.
Filed Apr. 18, 1972, Ser. No. 245,149
Int. Cl. C10g 39/10
U.S. Cl. 208—66
10 Claims

ABSTRACT OF THE DISCLOSURE

A naphtha boiling range hydrocarbon charge stock is converted into aromatic hydrocarbons and an isobutane concentrate via a combination process involving catalytic reforming, separation and hydrocracking. The catalytic reforming is effected in two distinct, individual reforming reaction zones, one of which operates at a relatively high severity, and the second of which operates at a relatively low severity. Following separation of an aromatic concentrate, the remaining saturated hydrocarbons are subjected to a particular hydrocracking process which results in exceedingly high yields of isobutane.

APPLICABILITY OF INVENTION

The present invention involves a multi-stage process for the conversion of naphtha, or gasoline boiling range hydrocarbons, to produce an aromatic concentrate and exceedingly large quantities of isobutane. More specifically, the inventive concept herein described is directed toward an integrated refinery process for producing a high-octane, unleaded gasoline pool.

Aromatic hydrocarbons, principally benzene, toluene, ethylbenzene and the various xylene isomers are required in large quantities to satisfy an ever-increasing demand for various petrochemicals which are sythesized therefrom. For example, benzene may be hydrogenated to produce cyclohexane for use in the manufacture of nylon; toluene is often used as a solvent and as a starting material for various medicines, dyes, perfumes, etc.; ethylbenzene is employed in large quantities in a dehydrogenation process to produce styrene. However, a principal utilization of aromatic hydrocarbons is as gasoline blending components in view of their exceedingly high research octane value. For example, benzene has a clear, unleaded research octane blending value of 99, while toluene and all the other aromatics have a blending value in excess of 100.

Isobutane finds widespread use in synthesis, as a refrigerant and as an aerosol propellant, etc. Other uses of isobutane include conversion to isobutenes for use in the production of butyl rubber, the manufacture of copolymer resins with butadiene, acrylonitrile, etc. In accordance with one embodiment of the present invention, the multiple-stage process, for producing an aromatic concentrate and isobutane, is integrated into an overall refinery scheme for the production of a high-octane, unleaded gasoline pool. The aromatic concentrate may be directly introduced into the unleaded gasoline pool while the isobutane concentrate is subjected to alkylation with a suitable olefinic hydrocarbon, the normally liquid alkylate product being recovered as a part of the unleaded gasoline pool.

Relatively recent investigations into the causes and cures of environmental pollution have shown that more than half of the violence committed with respect to the atmosphere stems from vehicular exhaust consisting primarily of unburned hydrocarbons and carbon monoxide. As a result of these investigations, a great deal of research has gone into the development of catalytic converters which, when installed within an automotive exhaust system, are capable of converting more than 90.0% of the noxious components into innocuous material. While developing these catalytic converters, it was learned that the efficiency of conversion, and particularly the stability of the selected catalytic composites was severely impaired when the exhaust fumes resulted from the combustion of lead-containing fuel. When compared to operation during the combustion of clear, unleaded gasolines, both the conversion of noxious components and catalyst stability decreased as much as 50.0% when the motor fuel contained lead and other metal additives. Therefore, it has been recognized throughout the petroleum industry, as well as in the major gasoline-consuming countries, that suitable gasoline must be produced without requiring the addition of lead to increase the octane rating. Also being recognized is the fact that unburned hydrocarbons and carbon monoxide are not the only extremely dangerous pollutants being discharged via vehicular exhaust. Japan has recently experienced an increase in the incidence of lead poisoning, and has thus enacted legislation to reduce the quantity of lead permitted in motor fuel gasolines intended for consumption in that country.

One natural consequence of the removal of lead from motor fuel gasoline, in addition to many others, resides in the fact that petroleum refinery operations will necessarily undergo modification in order to produce voluminous quantities of high-octane, unleaded motor fuels in an economically attractive fashion. One well known and well documented refining process, capable of significantly improving the octane-rating of gasoline boiling range fractions, is the catalytic reforming process. In such a process, the primary octane-improving reactions are naphthene dehydrogenation, naphthene dehydroisomerization, paraffin, dehydrocyclization and paraffin hydrocracking. Naphthene dehydrogenation is extremely rapid, and constitutes the principle octane-improving reaction. Paraffin aromatization is achieved through dehydrocyclization of a straight-chain paraffin; this reaction is rate limited in catalytic reforming operations. Unreacted, relatively low-octane paraffins, therefore, are present in the catalytically reformed product effluent and effectively reduce the octane rating thereof. When operating at a relatively high severity, the paraffinic hydrocarbons within the reforming zone are subjected to hydrogenative cracking. While this partially increases the octane rating of the gasoline boiling range product, substantial quantities of low molecular weight, normally gaseous material are produced. In view of the fact that hydrogen is present within the reaction zone, the light gaseous material is substantially completely saturated and comprises, methane, ethane and propane.

On the other hand, at a relatively low catalytic reforming operating severity, paraffin cracking is decreased with the result that an increased quantity of low octane rating saturates appears in the normally liquid product effluent. In order to upgrade the overall quality of the gasoline pool, either the addition of lead becomes necessary, or the low octane saturates must be subjected to further processing to produce higher octane components. As previously stated, subsequent processing of the saturates for octane-rating improvement can be eliminated by increasing the operating severity within the catalytic reforming reaction zone. The high severity operation produces a two-fold effect while increasing the octane rating; first, additional high octane aromatic components are produced and, secondly, the low octane rating components are at least partially eliminated either by conversion to aromatic components, or light normally gaseous hydrocarbons. The results, therefore, include lower liquid yields of gasoline both to "shrinkage" in molecular size when paraffins and naphthenes are converted to aromatics, and the production of the aforesaid light, normally gaseous components.

These problems are further compounded when the desired end result is the production of a high-octane, unleaded gasoline pool. In accordance with an overall refinery operation, into which the present invention is integrated, two low-severity catalytic reforming units are dove-tailed with at least a separation system, a particular hydrocracking unit and an alkylation unit. As hereinafter indicated, the end result is the production of a high-octane, unleaded gasoline pool, in volumetric yields greater than would be attainable by direct, high-severity catalytic reforming.

The hydrocarbonaceous charge stocks, contemplated for conversion in accordance with the present invention, constitute naphtha boiling range hydrocarbon fractions and/or distillates. "Gasoline boiling range hydrocarbons" generally connotes those hydrocarbons having an initial boiling point of at least about 100° F., and an end boiling point less than about 450° F., and the term is inclusive of intermediate boiling range fractions often referred to in the art "light naphtha" and "heavy naphtha." Light naphtha generally refers to a hydrocarbon mixture having an end boiling point in the range of about 280° F. to about 340° F. A heavy naphtha is considered a hydrocarbon mixture having an initial boiling point of about 280° F. and end boiling point of about 400° F. to about 450° F., and principally includes those hydrocarbons having seven or more carbon atoms per molecule. It is not intended, however, to limit the present invention by a specific charge stock having a particular boiling range. Suffice to say that suitable charge stocks will generally have an initial boiling point above about 100° F. and an end boiling point below about 450° F. The precise boiling range of any given naphtha charge stock will be dependent upon the economic and processing considerations prevalent in the particular locale where the charge stock is available.

The key feature of the present invention is a particular hydrocracking reaction zone wherein the saturated hydrocarbons, remaining after the separation of the aromatic concentrate resulting from both of the catalytic reforming zone effluents, are converted into exceedingly high yields of isobutane.

OBJECTS AND EMBODIMENTS

A principal object of the present invention is the simultaneous production of aromatic hydrocarbons and an isobutane concentrate. A corollary objective resides in the production of a high-octane, unleaded motor fuel gasoline pool.

Another object of my invention is to provide an integrated refinery operation for producing high liquid yields of a high-octane, unleaded gasoline pool.

Therefore, in a broad embodiment, the present invention involves a process for the simultaneous production of an aromatic concentrate and an isobutane concentrate, from a naphtha boiling point charge stock, which process comprises the steps of: (a) reacting said charge stock in a first catalytic reforming reaction zone, at reforming conditions selected to convert naphthenic hydrocarbons to aromatic hydrocarbons; (b) separating the resulting first reformed product effluent, in a first separation zone, to recover said aromatic concentrate and to provide a saturated normally liquid stream containing 5-membered ring naphthenes; (c) reacting at least a portion of said normally liquid stream with hydrogen in a hydrocracking reaction zone, at hydrocracking conditions selected to convert 5-membered ring naphthenes to 6-membered ring naphthenes and to produce isobutane, and in contact with a hydrocracking catalytic composite of a Group VIII noble metal component, or a nickel component, and the reaction product of alumina and a sublimed Friedel-Crafts metal halide; (d) separating the resulting hydrocracked product effluent, in a second separation zone, to recover said isobutanes and to provide a heptane-plus stream containing said six-membered ring naphthenes; (e) reacting said heptane-plus stream in a second catalytic reforming zone, at a lower operating severity than in said first catalytic reforming zone to convert said six-membered ring naphthenes to aromatic hydrocarbons; and, (f) separating the resulting second reformed product effluent in said first separation zone to recover said aromatic hydrocarbons.

A more limited embodiment of the present invention relates to a process for producing a high-octane, unleaded gasoline pool which comprises the steps of: (a) reacting a naphtha boiling range charge stock in a first catalytic reforming reaction zone, at reforming conditions selected to convert naphthenic hydrocarbons to aromatic hydrocarbons; (b) separating the resulting first reformed product effluent to provide (1) a normal pentane/hexane concentrate, (2) a first heptane-plus normally liquid stream containing 5-membered ring naphthenes and to recover aromatic hydrocarbons; (c) reacting at least a portion of said first heptane-plus stream with hydrogen in a hydrocracking reaction zone at hydrocracking conditions selected to convert 5-membered ring naphthenes to 6-membered ring naphthenes and to produce isobutane, and in contact with a hydrocracking catalytic composite of a Group VIII noble metal component or a nickel component, and the reaction product of alumina and a sublimed Friedel-Crafts metal halide; (d) separating the resulting hydrocracked product effluent to recover an isobutane concentrate and to provide a second heptane-plus stream containing 6-membered naphthenes; (e) reacting said second heptane-plus stream in a second catalytic reforming reaction zone, at a lower operating severity than in said first catalytic reforming zone to convert six-membered ring naphthenes to aromatic hydrocarbons; (f) reacting said normal pentane/hexane concentrate in a hydroisomerization reaction zone at isomerizing conditions selected to produce pentane and hexane isomers; (g) alkylating said isobutane concentrate with an olefinic hydrocarbon, in an alkylation reaction zone at alkylating conditions selected to produce a normally liquid alkylated hydrocarbon stream; and (h) recovering said aromatic hydrocarbons, said pentane and hexane isomers and said alkylated hydrocarbon stream as said high octane, unleaded gasoline pool.

Other embodiments of my invention involve the use of various catalytic composites, operating conditions and processing techniques. In one such other embodiment, the product effluents from the first and second catalytic reforming reaction zones are separated in a solvent extraction zone. In another such embodiment, at least a portion of the isobutane concentrate is reacted in a dehydrogenation reaction zone, at dehydrogenating conditions selected to produce butenes, and reacting said butenes in said alkylation reaction zone as said olefinic hydrocarbons.

SUMMARY OF INVENTION

As hereinbefore set forth, the present invention primarily involves two catalytic reforming reaction zones, a separation zone and a particular saturate cracking zone. Additionally, in other embodiments, an integrated refinery scheme, incorporating the process of the present invention, utilizes a solvent extraction zone, an isomerization reaction zone and an alkylation reaction zone. In a specific embodiment, the overall process includes a dehydrogenation reaction zone to produce the olefinic hydrocarbons utilized within the alkylation reaction zone. In order that a clear understanding of the integrated refinery process is obtained, a brief description of the various individual reaction and separation zones, utilized in one or more embodiments, is believed to be warranted. In describing each individual zone, one or more references to United States patents will be made in order that more detail will be readily available. Such references are not intended to be exhaustive or limiting, but simply exemplary and illustrative.

As hereinafter indicated in greater detail, an essential feature of the present invention resides in the use of a particular hydrocracking reaction zone and catalyst which produces a hydrocracked product effluent having unique characteristics. Not only is the hydrocracked effluent rich in isobutane and pentane/hexane isomers, but the naphthene content is found to be predominantly present in the six-membered ring configuration. The present invention takes advantage of this fact by providing a second catalytic reforming zone which functions at a lower operating severity than that imposed on the catalytic reforming zone which initially processes the fresh feed charge stock. The six-membered ring naphthenes are thus converted into aromatic hydrocarbons while paraffins and five-membered ring naphthenes are not affected. Furthermore, the five-membered ring naphthenes remaining, as well as those originally present in the naphtha boiling range charge stock, are converted into additional six-membered ring naphthenes in the hydrocracking reaction zone. The overall net result is the virtually complete elimination of low octane rating naphthenes and paraffins from the ultimate product.

CATALYTIC REFORMING ZONES

As hereinbefore stated, the present process utilizes two catalytic reforming reaction zones. In the interest of clarity, the "primary" reforming reaction zone will herein refer to that zone which initially processes the fresh feed charge stock, while "secondary" reforming zone will refer to that zone which processes at least a portion of the heptane-plus product effluent from the hydrocracking reaction zone. Although, by comparison with current standards, the primary reforming zone can be considered a low severity operation, the secondary reforming zone functions at a still lower operating severity level.

The naphtha boiling range charge stock to the primary catalytic reforming zone may be derived from a multitude of sources. For example, one such source constitutes those naphtha distillates which are derived from a full boiling range petroleum crude oil; another source is a naphtha fraction obtained from the catalytic cracking of gas oils, while another source constitutes the gasoline boiling range effluent from a hydrocracking reaction zone processing heavier-than-gasoline charge stock. Since the greater proportion of such naphtha fractions are contaminated through the inclusion of sulfurous and nitrogenous compounds, it is contemplated that the primary catalytic reforming reaction zone may have integrated therein a hydrorefining zone, complete details of which are well known and thoroughly described in the prior art.

Catalytic composites, for utilization in both reforming reaction zones, include a refractory inorganic oxide carrier material containing a catalytically active metallic component which is generally selected from the noble metals Group VIII. Recent developments in the area of catalytic reforming have indicated that catalyst activity and stability are significantly enhanced through the addition of various modifiers, especially tin, rhenium, nickel and/or germanium.

With respect to the primary reforming reaction zone, suitable porous carrier materials include refractory inorganic oxides such as alumina, silica, zirconia, etc., and crystalline aluminosilicates such as the faujasites, or mordenite, or combinations of refractory inorganic oxides with the various crystalline aluminosilicates. With respect to the catalytic composite disposed in the secondary reforming reaction zone, it is particularly preferred that the same be non-acidic. Therefore, the carrier material will generally consist essentially of alumina. Generally favored metallic components, for utilization in both reforming reaction zones, include ruthenium, rhodium, palladium, osmium, iridium, platinum, rhenium, germanium, nickel and tin, as well as mixtures thereof. These metallic components are employed in concentrations ranging from about 0.01% to about 5.0% by weight, and preferably from about 0.01% to about 2.0% by weight. Since one of the functions of the primary reforming reaction zone is the dehydrocyclization of paraffins to form aromatics, the catalyst disposed therein may also contain combined halogen selected from the group of fluorine, chlorine, bromine, iodine and mixtures thereof. Since these components impart a degree of acidity to the composite, they are not intentionally employed in the secondary reforming reaction zone.

Illustrations of catalytic reforming process schemes are found in U.S. Pats. 2,905,620 (Class 208–65), 3,000,812 (208–138) and 3,296,118 (Class 208–100). Effective reforming operating conditions include catalyst temperatures within the range of about 800° F. to about 1100° F., preferably having an upper limit of about 1050° F. The liquid hourly space velocity, defined as volumes of hydrocarbon charge per hour per volume of catalyst disposed within the reforming reaction zone, is generally in the range of about 1.0 to about 5.0, although space velocities from about 0.5 to about 15.0 may be employed. The quantity of hydrogen-rich gas in admixture with the hydrocarbon feed stock to the reforming reaction zone is generally from about 1.0 to about 20.0 mols of hydrogen per mol of hydrocarbon. The reforming reaction zone effluent is generally introduced into a high-pressure separation zone at a temperature of about 60° F. to about 140° F., to separate lighter gaseous components from heavier, normally liquid components. Since normal reforming operations produce large quantities of hydrogen, a certain amount of the recycle gaseous stream is removed from the reforming system by way of pressure control. It is within the scope of the present invention that such excess hydrogen be employed in the hydrogen-consuming hydrocracking reaction zone as make-up hydrogen, as well as in the hydroisomerization reaction zone. Pressures in the range of about 100 to about 1500 p.s.i.g. are suitable for effecting catalytic reforming reactions.

With respect to the primary catalytic reforming reaction zone, utilized in the present combination process, the reactions effected therein are conducted at a relatively low operating severity. To those familiar with the catalytic reforming art, the term "relatively high severity" indicates high temperature or low space velocity, or both a high temperature and low space velocity. The most noticeable direct result of a high severity operation is found in the octane rating of the normally liquid product effluent. Generally speaking, high operating severity levels are required for products having higher octane ratings. While the reforming zone utilized in the present process does not necessarily upgrade the octane rating of the charge stock to the level ultimately attained with respect to the unleaded gasoline pool, the charge stock is substantially improved in octane rating. As utilized herein, the term "low severity reforming" alludes to a reforming process in which substantial quantities of naphthenic hydrocarbons are dehydrogenated to high octane aromatic hydrocarbons, while the cracking of paraffinic hydrocarbons is inhibited. Some dehydrocyclization of paraffinic hydrocarbons, to produce additional aromatics, is also effected in the primary catalytic reforming reaction zone. However, the greater proportion of paraffins originally present in the fresh feed charge stock remain intact and are subsequently processed in the hydrocracking reaction zone for the purpose of producing large quantities of isobutane. Thus, the low severity reforming operation, as effected in the primary reaction zone, may be defined by stating that about 90.0 to about 100.0 mols of aromatics are produced for every 100.0 mols of 6-membered ring naphthenes in the charge stock, while less than about 40.0 mols of aromatics are produced for every 100.0 mols of paraffinic hydrocarbons. In determining the degree of conversion of naphthenes to aromatics (dehydrogenation) and alkanes to aromatics (dehydrocyclization), it is assumed that a relatively small amount of naphthenes are cracked or otherwise converted to hydrocarbons other than aromatics, and that the major portion of paraffins which disappear are converted to aromatic hydrocarbons while some additional naphthenes are formed.

As hereinbefore set forth, the principal function of the secondary catalytic reforming reaction zone is to effect the dehydrogenation of six-membered ring naphthenes which are retained in the effluent from the hydrocracking reaction zone. For this reason, the catalytic composite disposed in the secondary reforming reaction zone is substantially non-acidic, and may even contain catalytic attenuators to counteract the inherent acidity possessed by the catalytic metal components and the alumina carrier material. Such attenuators are generally selected from the alkali and alkaline-earth metals. Furthermore, the operating severity in the secondary catalytic reforming reaction zone is at a lower level than that within the primary catalytic reforming reaction zone. Therefore, the former will generally function at a higher liquid hourly space velocity and a lower temperature than that imposed upon the latter.

AROMATIC SEPARATION ZONE

The product effluents from both of the catalytic reforming reaction zones are rich in aromatic hydrocarbons and normally liquid saturates including paraffins and five-membered ring naphthenes. In the hydrocarcking reaction zone, the paraffins are converted into substantial quantities of isobutane while the five-membered ring naphthenes are converted into six-membered ring naphthenes, the latter being subsequently introduced into the secondary catalytic reforming reaction zone. The saturated material is separated from the aromatic hydrocarbons by any suitable separation technique known in the art. However, a greater degree of efficiency is achieved through the use of a solvent extraction system. Solvent extraction, to produce an aromatic concentrate and a paraffinic raffinate, is a well known technique which is thoroughly described in the published literature. For example, suitable techniques involve the operations illustrated in U.S. Pats. Nos. 2,730,558 (Class 260–674) and 3,361,664 (Class 208–313).

As previously stated, the product effluent from the reforming reaction zone is generally introduced into a high pressure separator at a temperature sufficient to provide a normally liquid hydrocarbon phase and a hydrogen-rich recycle gaseous phase. Other separations, contemplated within the scope of the present invention, which may be considered either within the catalytic reforming system or the aromatic separation system, include the recovery of a propane/butane concentrate, an ethane-minus gaseous phase and a pentane/hexane concentrate. It is also within the scope of the present invention, although not a preferred technique, to introduce the total pentane-plus portion of the reformed product effluent into the solvent extraction zone, subsequently separating a pentane/hexane fraction from the paraffinic raffinate. In the preferred mode of operation, the reformed product effluents are separated to provide a heptane-plus stream which is introduced into the aromatic separation system.

In any event, the solvent extraction system utilizes a solvent having a greater selectivity and solvency for the aromatic components than for the paraffinic components. Selective solvents may be selected from a wide variety of normally liquid organic compounds of polar character; that is, compounds containing a polar radical. A preferred solvent is one which boils at a temperature above the boiling point of the hydrocarbon mixture at the ambient extraction pressure. Illustrative, specific organic compounds, useful as selective solvents in extraction processes for the recovery of aromatic hydrocarbons, include alcohols, such as the glycols, ethylene glycol, propylene glycol, butylene glycol, tetraethylene glycol, glycerol, diethylene glycol, dipropylene glycol, dimethylether of ethylene glycol, triethylene glycol, tripropylene glycol, etc.; other organic solvents well known in the art, for extraction of hydrocarbon components from mixtures thereof with other hydrocarbons, may be suitably employed. A particularly preferred class of solvents are those charcaterized as the "sulfolane-type." Thus, as indicated in U.S. Pat. No. 3,470,087 (Class 208–321), the preferred solvent is one having a five-membered ring, one atom of which is sulfur, the other four being carbon, and having two oxygen atoms bonded to the sulfur atom. In additional to sulfolane, the preferred class includes the sulfolenes such as 2-sulfolene and 3-sulfolene.

The aromatic selectivity of the preferred solvents is further enhanced through the addition of water. This increases the selectivity of the solvent phase for aromatic hydrocarbons over non-aromatic hydrocarbons without substantially reducing the solubility of the solvent phase for aromatic hydrocarbons. In general, the solvent composition contains from about 0.5% to about 20.0% by weight of water, and preferably from about 2.0% to about 15.0%, depending primarily on the particular solvent and the process conditions under which the extraction, extractive distillation and solvent recovery zones are operated. In general, solvent extraction is conducted at elevated temperatures and pressure which are selected to maintain the charge stock and solvent in the liquid phase. Suitable temperatures are within the range of about 80° F. to about 400° F., and preferably from about 150° F. to about 300° F. Operating pressures include super-atmospheric pressures up to about 400 p.s.i.g., and preferably from about 15.0 p.s.i.g. to about 150 p.s.i.g.

Typical extractive distillation zone pressures are from about atmospheric to about 100 p.s.i.g., although the pressure at the top of the distillation zone will generally be maintained in the range of about 1 p.s.i.g. to about 20 p.s.i.g. The reboiler temperature is dependent upon the composition of the feed stock and the selected solvent, although temperatures of from about 275° F. to about 360° F. appear to yield satisfactory results. The solvent recovery system is operated at low pressures and sufficiently high temperatures to drive the aromatic hydrocarbons overhead, thus producing a lean solvent bottoms stream. Preferably, the top of the solvent recovery zone is maintained at pressures from about 100 to about 400 millimeters of mercury absolute. These low pressures must be employed since the reboiler temperature should be maintained below 370° F. in order to avoid the thermal decomposition of the organic solvent.

HYDROCRACKING REACTION ZONE

In a preferred embodiment, the charge to the hydrocracking reaction zone will be the heptane-plus paraffinic concentrate remaining in the catalytically reformed product effluents following removal of the aromatics therefrom in the solvent extraction zone. Although the hydrocracking feed stock may contain the pentane/hexane paraffins, a preferred technique, as hereinafter set forth, involves separate recovery of a pentane/hexane concentrate for utilization as the charge to a hydroisomerization reaction zone wherein the same is converted into pentane and hexane isomers of significantly increased octane rating. The hydrocracking reaction zone of the present process is unlike present-day hydrocracking processes both in function and result. The charge to the hydrocracking zone constitutes paraffinic hydrocarbons boiling within the naphtha boiling range, and the product effluent contains very little, if any, methane and ethane. Propane recovered from the hydrocracking zone effluent can be utilized for subsequent alkylation or isopropylalcohol production; another valuable use of propane is as a component of liquefied petroleum gas. Through the utilization of a particular catalytic composite and operating conditions, the hydrocracking of the paraffinic raffinate produces relatively large quantities of butanes, which butane concentrate is rich in isobutane, while preserving naphthenic ring compounds. In fact, as hereinbefore set forth, the hydrocracking reaction zone has the capability to convert five-membered ring naphthenes into six-membered ring naphthenes. One example of this is the conversion of methylcyclopentane to cyclohexane which is subsequently dehydrogenated to benzene in the secondary reforming reaction zone. In view of the unique character of the product effluent, being rich in isobutane, the hydrocracking reaction zone is referred to herein as "I-cracking."

Thus, with respect to increasing the yield of normally liquid hydrocarbons in the unleaded gasoline pool, the butane concentrate can be subjected to alkylation with a suitable olefinic hydrocarbon. Furthermore, with respect to the pentane/hexane concentrate in the hydrocracked product effluent, the same is rich in pentane and hexane isomers; these can be separately recovered and sent directly to the unleaded gasoline pool.

The hydrocracking reaction conditions, under which the process is effected, will vary according to the physical and chemical characteristics of the charge stocks. In the past, hydrocracking reactions have generally been effected and pressures in the range from about 1,500 to about 5,000 p.s.i.g., a liquid hourly space velocity of about 0.25 to about 5.0, hydrogen circulation rates of about 5,000 to about 50,000 s.c.f./bbl. and maximum catalyst temperatures in the range of about 700° F. to about 950° F. As discussed in the prior art, heavier charge stocks require a relatively high severity of operation including high pressures, high catalyst bed temperatures, a relatively low liquid hourly space velocity and high hydrogen concentrations. Lower severity operations may be employed with comparatively lighter feed stocks such as kerosenes and light gas oils. In the practice of the present invention, regardless of the characteristics of the naphtha charge stock, the hydrocracking process is effected at a lower severity of operation than those commonly in use. In accordance with the present invention, the hydrocracking reaction zone has disposed therein a catalytic composite comprising a Group VIII noble metal component, or a nickel component, and the reaction product of alumina and a sublimed Friedel-Crafts metal halide. The conversion conditions include a liquid hourly space velocity of 0.5 to about 10.0, a hydrogen circulation rate of about 3,000 to about 20,000 s.c.f./bbl., a pressure from about 200 to about 2,000 p.s.i.g., and preferably up to about 1,000 p.s.i.g., and of greater significance, a maximum catalyst bed temperature from about 300° F. to about 480° F. In many instances, the operating pressure will consistently be in the range from about 200 to about 500 p.s.i.g.

As hereinbefore set forth, the hydrocracking reaction zone utilizes a catalytic composite containing a Group VIII noble metal component, or a nickel component, and the reaction product of alumina and a sublimed Friedel-Crafts metal halide. Thus, where the metal halide is, for example, aluminum chloride, the catalytic composite is characterized in that it contains the following group:

$$-Al-O-AlCl_2$$

First considering the porous material serving as the carrier for the active metallic components, it is preferred that it be adsorptive and possess a high surface area of about 25 to about 500 square meters per gram. Heretofore, suitable carrier materials have been selected from the group of amorphous refractory inorganic oxides including alumina, titania, zirconia, silica, mixtures thereof, etc. When of the amorphous type, the preferred prior art carrier material, for use in a hydrocracking catalytic composite, appears to be a composite of alumina and silica, with the latter being present in an amount of about 10.0% to about 90.0% by weight. Recent developments in the area of catalysis have further shown that various crystalline aluminosilicates can be utilized to advantage in some hydrocracking situations. Such zeolitic material includes mordenite, faujasite, Type A or Type U molecular sieves, etc.

In view of the fact that a sublimed Friedel-Crafts metal halide is insufficiently strong to react with silica, to form the type of group hereinabove described, the preferred carrier material is alumina. While the action and effect of the sublimed metal halide on refractory material other than alumina and silica, for example, zirconia, is not known with accuracy, it is not believed that the reaction takes place to a degree sufficient to produce the desired catalyst and result. The hydrocracking catalytic composite contains a Group VIII noble metal component, or a nickel component. Thus, suitable metals are those of the group including platinum, palladium, rhodium, ruthenium, osmium, iridium, and nickel. Iron and cobalt components do not appear to possess the propensity for effecting the desired degree of hydrocracking, and are, therefore, excluded from the group of suitable metallic components. A particularly preferred catalytic composite contains a platinum, palladium or nickel component. These metal compounds, for example platinum, may exist within the final composite as a compound such as an oxide, sulfide, halide, etc., or in an elemental state. Generally, the amount of the noble metal component is small compared to the quantities of the other components combined therewith. When calculated on an elemental basis, the noble metal components generally comprise from about 0.1% to about 2.0% by weight of the final composite. With respect to the nickel component, and calculated on the basis of the elemental metal, it will be present within the catalytic composites in an amount from about 1.0% to about 10.0% by weight.

The metallic components may be incorporated within the catalytic composite in any suitable manner including co-precipitation or co-gellation with the carrier material, ion-exchange or impregnation. The latter constitutes the preferred method of preparation, utilizing water-soluble compounds of the various metallic components. Thus, a platinum component may be added to the carrier material by commingling the latter with an aqueous solution of chloroplatinic acid. Other water-soluble compounds may be employed, and include ammonium chloroplatinate, platinum chloride, chloropalladic acid, palladic chloride, nickel nitrate hexahydrate, nickel chloride, etc. Following impregnation, the carrier material is dried and subjected to a calcination, or oxidation technique, generally followed by reduction in hydrogen at an elevated temperature.

An essential ingredient of the catalytic composite is a Friedel-Crafts metal halide which, when sublimed, combines with the alumina by way of reaction therewith. The method of incorporating the Friedel-Crafts metal halide involves a sublimation, or vaporization technique, with the vaporized metal halide contacting alumina already containing the Group VIII noble metal component, or the nickel component. That is, the catalytically active metal components are corposited with the alumina before the latter is contacted with the sublimed metal halide. Briefly, therefore, the preferred technique involves the incorporation of the Frienel-Crafts metal halide after the catalytically active metallic components have been impregnated onto the carrier material, and after the same has been dried, calcined and reduced in hydrogen. When the sublimation technique is utilized, the metal halide will be vaporized onto the carrier, then heated to a temperature of about 300° C., and for a time sufficient to remove any unreacted metal halide. Thus, the final catalytic composite does not contain any free Friedel-Crafts metal halide. Following vaporization of the Friedel-Crafts metal halide, and heating of the thus-formed composite, the refractory oxide will be increased in weight by from about 2.0% to about 25.0%, based upon the original weight of the carrier material. While the exact increase in weight does not appear to be critical, high activity catalysts are obtained when the thus-treated refractory material has a weight increase of about 5.0% to about 20.0%. On the basis of the quantity of the metal halide combined therewith, the treated carrier material will contain from about 1.96% to about 20.0% by weight of the metal halide, and preferably from about 4.7% to about 16.67% by weight. Additional details of the sublimation technique may be found in U.S. Pat. No. 2,924,628 (Class 260–666). Since the desired group, as hereinbefore set forth, is sensitive to moisture, the sublimation technique is effected after the Group VIII noble metal component, or nickel component, has been combined with the alumina.

Various Friedel-Crafts metal halides may be utilized, but not necessarily with equivalent results. Examples of such metal halides include aluminum bromide, aluminum chloride, antimony pentachloride, beryllium chloride, germanium tetrachloride, ferric bromide, ferric chloride, gallium trichloride, stannic bromide, stannic chloride, titanium tetrabromide, titanium tetrachloride, zinc bromide, zinc chloride, etc. The Friedel-Crafts aluminum halides are preferred, with aluminum chloride and/or aluminum fluoride being particularly preferred. This is so, not only due to the ease of preparation, but also because the thus-prepared catalysts have an exceptionally high activity for the selective production of isobutane as well as the conversion of five-membered ring naphthenes to six-membered ring naphthenes.

Temperatures at which the Friedel-Crafts metal halide is vaporized onto the alumina will vary in accordance with the particular metal halide utilized. In most instances, the vaporization is carried out either at the boiling, or sublimation point of the particular Friedel-Crafts metal halide, or at a temperature not greatly exceeding these points; for example, not greater than 100° C. higher than the boiling point, or sublimation point. In effecting one catalyst preparation, the amorphous carrier material has aluminum chloride sublimed thereupon. Aluminum chloride sublimes at a temperature of about 178° C., and thus, a suitable vaporization temperature will range from about 180° C. to about 275° C. The sublimation technique may be carried out under pressure, and also in the presence of diluents such as inert gases. Although the particularly preferred technique involves the direct sublimation of a metal halide to react with the alumina, the reaction product can result from a halide-containing compound which initially reacts with the alumina to form aluminum halide which, in turn, reacts with additional alumina, thereby forming groups of —Al—O—AlCl$_2$. Such halide-containing compounds include CCl$_4$, SCl$_2$, SOCl$_2$, PCl$_3$, POCl$_3$, etc. Prior to its use, the catalytic composite may be subjected to a substantially water-free reduction technique. This is designed to insure a more uniform and finely-divided dispersion of the metallic components throughout the carrier material. Substantailly pure and dry hydrogen is employed as the reducing agent at a temperature of about 800° F. to about 1200° F., and for a time sufficient to reduce the metallic components.

In view of the fact that the reactions being effected are exothermic in nature, an increasing temperature gradient is experienced as the hydrogen and paraffinic raffinate traverse the catalyst bed. In accordance with the present process, the maximum catalyst bed temperature, virtually the same as that measured at the outlet of the reaction zone, is maintained in the range of about 300° F. to about 480° F. In order to assure that the catalyst bed temperature does not exceed the maximum allowable, the use of conventional quench streams, either normally liquid, or normally gaseous, and introduced at one or more intermediate loci of the catalyst bed, is contemplated.

As hereinbefore set forth, the product effluent from the hydrocracking reaction zone is predominantly butanes, the greater proportion of which constitutes isobutane. For this reason, the hydrocracking reaction zone is herein referred to as "I-cracking," the "I" alluding to isomer production.

ALKYLATION REACTION ZONE

Since the preferred use of the present inventive concept is the integration thereof into an overall refinery scheme with the production of a high octane, unleaded motor fuel gasoline pool, the isobutane-rich effluent from the I-cracking zone may be utilized as fresh feed to an alkylation reaction zone. The alkylation is effected by intimately commingling the isobutane feed, an olefinic hydrocarbon and a particular catalyst as hereinafter described. It is understood that the source of the olefinic hydrocarbon, for utilization in the alkylation reaction zone, is not essential to the process encompassed by the present invention. Thus, "outside" olefinic material may be brought into the described process from any suitable source including a fluid catalytic cracking unit, or a thermal cracking unit. However, as stated in another specific embodiment of the present invention, at least a portion of the isobutane concentrate may be subjected to dehydrogenation in a dehydrogenation reaction zone to produce the alkylatable olefinic hydrocarbons. Similarly, the propane/butane concentrate obtained by the separation of the catalytically reformed product effluent may also be dehydrogenated and introduced into the alkylation reaction zone, as a portion of the olefinic hydrocarbons.

The alkylation reaction zone may be any acidic catalyst reaction system such as a hydrogen fluoride-catalyzed system, or one which utilizes sulfuric acid. Hydrogen fluoride alkylation is particularly preferred, and may be conducted substantially as set forth in U.S. Pat. No. 3,249,650 (Class 260–63.48). Briefly, the alkylation conditions, when effected in the presence of hydrogen fluoride catalysts, are such that the catalyst to hydrocarbon volume ratio within the alkylation reaction zone is in the range of about 0.5 to about 2.5. Ordinarily, anhydrous hydrogen fluoride will be charged to the alkylation system as fresh catalyst; however, it is possible to utilize hydrogen fluoride containing as much as about 10.0% by weight of water. Excessive dilution with water is generally to be avoided since it tends to reduce the alkylating activity of the catalyst and further introduces a wide variety of corrosion problems into the process. In order to reduce the tendency of the olefinic portion of the charge stock to undergo polymerization prior to alkylation, the molar proportion of isoparaffins to olefinic hydrocarbons within the alkylatin reaction zone is desirably maintained at a value greater than 1.0, and preferably from about 3.0 to about 15.0. Alkylation reaction conditions also include a temperature from 0° to about 200° F., and preferably from about 30° F. to about 125° F. The pressure maintained within the alkylation system is ordinarily at a level sufficient to maintain the hydrocarbons and hydrogen fluoride catalyst in substantially liquid phase; that is, from about atmospheric to about 40 atmospheres. The contact time within the alkylation reaction zone is conveniently expressed in terms of space-time, being defined as volume of catalyst within the contact zone divided by the volume rate per minute of hydrocarbon reactants charged to the zone. Usually, the space-time factor will be less than thirty minutes and more preferably less than about fifteen minutes.

The alkylation reaction zone effluent is separated to provide an acid phase and a hydrocarbon phase, the latter being separated to recover the normally liquid alkylate product and unreacted isobutane. The alkylate product, in combination with the aromatic concentrate from the solvent extraction zone forms part of the unleaded gasoline pool, along with the isopentane and isohexanes from the I-cracking zone. Unreacted isobutane and olefinic hydrocarbons, if any, may be recycled to the alkylation reaction zone, or a portion thereof may be diverted to the dehydrogenation reaction zone for the purpose of producing additional olefinic hydrocarbons for utilization in the alkylation reaction zone.

ISOMERIZATION REACTION ZONE

As previously indicated, a significant quantity of pentanes and hexanes are produced in the catalytic reforming reaction zone. Additionally, in those instances where the fresh feed charge stock to the process is a full boiling range naphtha distillate, the same may contain a pentane/hexane concentrate. In view of the fact that normal pentane has a clear research octane rating of 62 and normal hexane a clear research rating of only 25, these components are not desirable in a gasoline pool which is intended to be free from lead additives.

Therefore, in still another embodiment of the present invention, the pentane/hexane stream is introduced into an isomerization reaction zone for the purpose of producing an effluent rich in pentane and heptane isomers. For example, isopentane has a research clear octane rating of 93, while 2,2-dimethylbutane has a rating of 92 and 2,3-dimethylbutane a rating of 104; the average clear research octane rating of the mono-methylpentanes is 74. Since the selectivity of conversion in the isomerization reaction zone is virtually 100.0%, the unleaded gasoline pool can be significantly increased in its clear research octane rating through the production of pentane/hexane isomers without incurring a detrimental volumetric yield loss.

As indicated in U.S. Pat. No. 3,131,235 (Class 260–683.3), the isomerization process is effected in a fixed-bed system utilizing a catalytic composite of a refractory inorganic oxide carrier material, a Group VIII noble metal component and combined halogen preferably selected from fluorine, chlorine and mixtures thereof. The refractory inorganic oxide carrier material may be selected from the group including alumina, silica, titania, zirconia, mixtures of two or more, and various naturally-occurring refractory inorganic oxides. Of these, a synthetically-prepared gamma alumina is preferred. The Group VIII noble metal is generally present in an amount of about 0.01% to about 2.0% by weight, and may be one or more metals selected from the group of ruthenium, rhodium, osmium, iridium, and especially platinum, or palladium. The amount of combined halogen will be varied from about 0.01% to about 8.0% by weight. Both fluorine and chlorine may be used to supply the combined halogen, although the use only of fluorine, in an amount of about 2.5% to about 5.0% by weight, is preferred.

Isomerization reactions are preferably effected in a hydrogen atmospere utilizing sufficient hydrogen so that the hydrogen to hydrocarbon mol ratio to the reaction zone will be within the range of about 0.25 to about 10.0. Operating conditions will additionally include temperatures ranging from about 200° F. to about 800° F., although lower temperatures within the more limited range of about 300° F. to about 525° F. will generally be utilized. The pressure, under which the reaction zone is maintained, will range from about 50 to about 1500 p.s.i.g. The reaction products are separated from the hydrogen, which is recycled and subsequently subjected to fractionation and separation to recover the desired reaction product. Recovered starting material is also recycled so that the overall process yield is relatively high. The liquid hourly space velocity will be maintained in the range of about 0.25 to about 10.0, and preferably within the range of about 0.5 to about 5.0 Another suitable isomerization process is found in U.S. Pat. No. 2,924,628 (Class 260–666).

DEHYDROGENATION REACTION ZONE

As previously set forth, at least a portion of the isobutane-rich effluent from the I-cracking reaction zone may be subjected to dehydrogenation to produce the olefins required in the alkylation reaction zone. In still another embodiment, at least a portion of the propane/butane concentrate recovered from the catalytic reforming reaction zones may also be subjected to dehydrogenation. The advisability of the utilization of either, or both techniques will be primarily dependent upon the availability of outside olefins; for example, from a catalytic or thermal cracking unit. When dehydrogenation is deemed desirable, it may be effected essentially as set forth in U.S. Pat. No. 3,293,219 (Class 260–683.3). Briefly, the dehydrogenation reactions are generally effected at conditions including a temperature in the range of from 400° C. to about 700° C., a pressure of from about atmospheric to about 100 p.s.i.g., a liquid hourly space velocity within the range of 1.0 to about 40.0 and in the presence of hydrogen in an amount to result in a mol ratio of from 1:1 to about 10:1, based upon the paraffin charge.

The dehydrogenation catalyst is a composite of an inorganic oxide carrier material, an alkali metal component, a Group VIII metal component, and a catalytic attenuator from the group consisting of arsenic, antimony and bismuth. A patricularly preferred catalyst comprises lithiated alumina containing about 0.05% to about 5.0% by weight of a Group VIII noble metal, especially platinum. The catalytic attenuator is employed in amounts based upon the concentration of a Group VIII noble metal component. For example, arsenic is present in an atomic ratio of arsenic to platinum in the range of about 0.20 to about 0.45. Although lithium is the preferred alkalinous metal component, the catalyst may contain calcium, magnesium, strontium, cesium, rubidium, potassium, sodium, mixtures thereof, etc. Still another preferred catalyst contains, in addition to the noble metal component, a component from the group of tin, germanium and rhenium.

The dehydrogenation reaction conditions, as well as the catalytic composite, are selected to result in a relatively low conversion per pass, accompanied, however, by a relatively high selectivity to the desired olefinic hydrocarbons. Thus, while the conversion per pass might range from about 10.0% to about 35.0%, the selectivity of conversion will range from about 93.0% to about 97.0%, or higher. In view of the fact that the alkylation reactions are effected with a molar excess of paraffins over olefinic hydrocarbons, the high selectivity and relatively low conversion, in the dehydrogenation reaction zone, are advantageous.

DESCRIPTION OF DRAWING

The inventive concept, encompassed by the present process, and a preferred embodiment, are illustrated in the accompanying drawing. The illustration is presented by way of a block-type flow diagram, in which each block represents one particular step, or stage of the process. Miscellaneous appurtenances, not believed necessary for a clear understanding of the present combination process, have been eliminated from the drawing. The use of such details as pumps, compressors, instrumentation and controls, heat-recovery circuits, miscellaneous valving, start-up lines and similar hardware, etc., is well within the purview of one skilled in the art. Similarly, with respect to the flow of materials throughout the system, only those principal streams required to illustrate the interconnection and interaction of the various conversion zones are presented; thus, internal recycle lines, vent gas streams, etc., have also been eliminated. With reference now to the drawing, the basic inventive concept is depicted by reforming zone 2 (primary), extraction zone 4, I-cracking zone 9 and reforming zone 6 (secondary). Separation system 11 serves to provide the various indicated streams and to separate a heptane-plus fraction, containing six-membered ring naphthenes, which fraction is introduced into secondary reforming zone 6 to produce additional aromatics. The drawing will be described in conjunction with a commercially-scaled unit designed to process 25,000 bbl./day of a heptane-plus, straight-run naphtha which has been subjected to hydrorefining for desulfurization and olefin saturation. Pertinent properties of the naphtha fraction include a gravity of 56.4° API, an initial boiling point of about 194° F., a 50.0% volumetric distillation temperature of about 255° F. and an end boiling point of about 362° F.; a hydrocarbon-type analysis indicates that the charge stock contains approximately 44.4% by volume paraffins, 48.8 % by volume naphthenes and 6.8% by volume aromatics.

Figure 1:
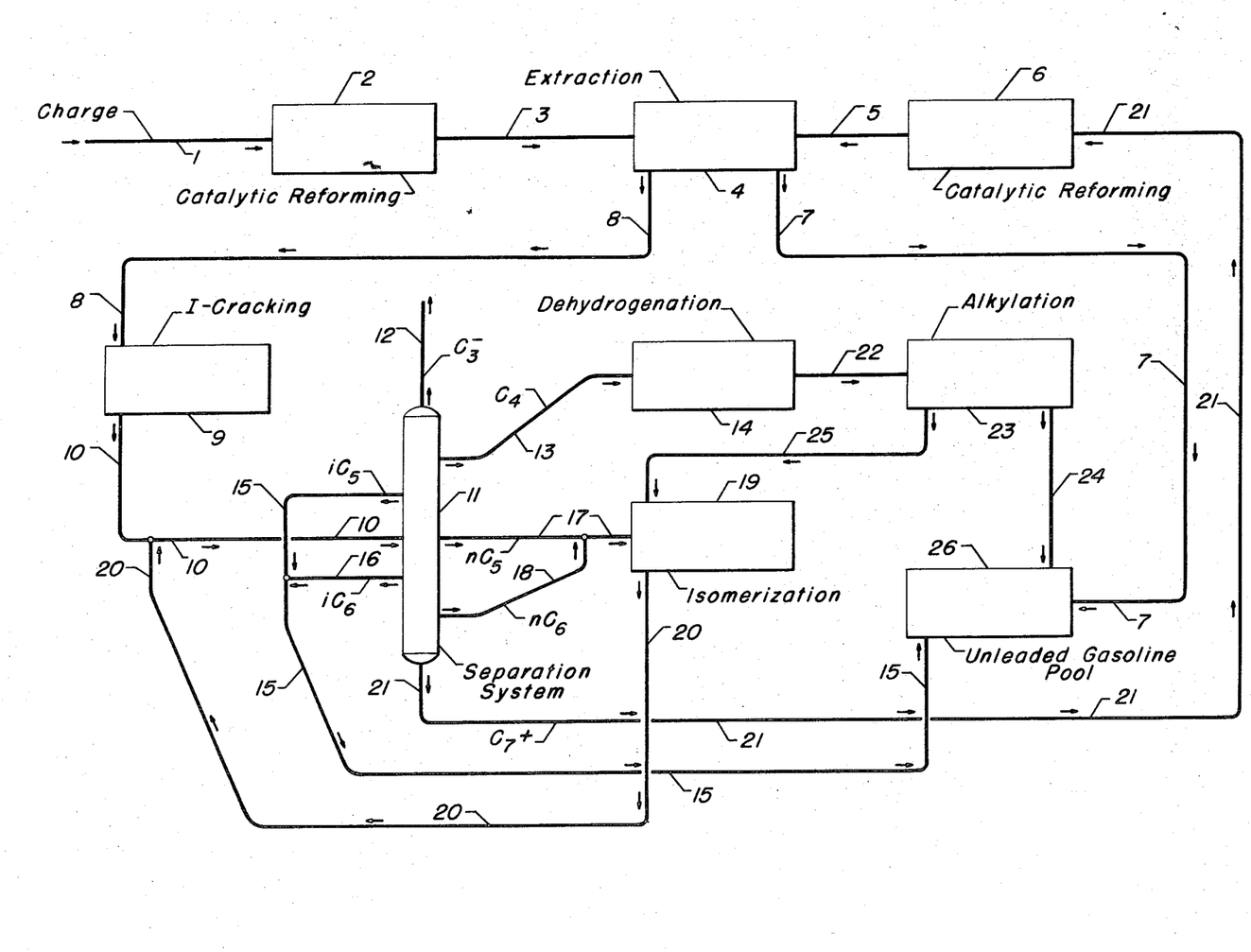

The fresh feed is introduced via line 1 into reforming zone 2 which constitutes a low-severity reforming system intended for the production of a maximum quantity of a normally liquid product effluent having a clear research octane rating of about 89.0 or 90.0. Operating conditions are selected to maximize the dehydrogenation of naphthenes to aromatics while simultaneously minimizing the hydrocracking of paraffins. Therefore, the charge is catalytically reformed at conditions including a pressure of about 150 p.s.i.g., a liquid hourly space velocity of 3.0, a hydrogen/hydrocarbon molal ratio of about 900° F. the average catalyst bed temperature of about 900° F. the catalytic composite is an alumina carrier material containing 0.60% by weight of platinum, 0.35% by weight of germanium and 0.80% by weight of combined chloride, all of which are computed on the basis of the elements.

The product stream is separated to provide an internal hydrogen-rich recycle gas stream and a heptane-plus concentrate. Although the entire normally liquid portion of the product effluent may be introduced via line 3 into extraction zone 4, it is preferred to introduce the hexane-minus portion into separation system 11, which technique is not illustrated, limiting the material in line 3 to heptane-plus hydrocarbons. Component yields and product distribution respecting the effluent from primary catalytic reforming zone 2 are presented in the following Table I.

TABLE I.—PRIMARY REFORMING ZONE PRODUCT DISTRIBUTION

| Component | Wt. percent | Vol. percent |
|---|---|---|
| Hydrogen | 2.64 | |
| Methane | 0.65 | |
| Ethane | 0.89 | |
| Propane | 1.10 | 1.59 |
| Isobutane | 0.47 | 0.63 |
| N-butane | 0.37 | 0.48 |
| Isopentane | 1.82 | 2.19 |
| N-pentane | 0.65 | 0.78 |
| Hexane-plus | 91.49 | 85.75 |

Catalytic reforming is a hydrogen-producing process, and the 2.64% by weight of hydrogen, or about 1,310 s.c.f./Bbl., may be utilized to advantage in the I-cracking zone, or in the prior hydrorefining zone, wherein hydrogen-consuming reactions are effected. As previously stated, it is preferred to limit the feed to extraction zone 4 to the heptane-plus portion of the product effluent. Therefore, of the hexane-plus portion, the hexanes, in an amount of about 1,438 bbl./day are withdrawn directly and introduced into separation system 11, along with about 743 bbl./day of pentanes.

The remaining portion, in an amount of about 20,000 bbl./day is introduced into the lower portion of an extraction column (in extraction zone 4) countercurrently to a lean solvent stream being introduced into an upper portion of said column; the mole ratio of solvent to hydrocarbon is about 3.2:1.0. The selected solvent is sulfolane, and the extraction column functions at a top pressure of about 15.0 p.s.i.g. and a reboiler temperature of about 320° F. A saturate-rich raffinate stream is withdrawn as an overhead product, while the rich solvent bottoms stream is introduced into an extractive distillation zone. Additional raffinate is withdrawn as an overhead stream, combined with the saturate-rich raffinate from the extraction column, and passed through line 8 into I-cracking reaction zone 9. Rich solvent is introduced into a solvent recovery system which functions at sufficiently low pressures and high temperatures to drive aromatics overhead while producing a lean solvent bottoms stream for recycle to the extraction column. With respect to the raffinate stream in line 8, beneficial results are obtained, with respect to the subsequent I-cracking reactions, when the stream is substantially free from solvent. A suitable scheme, for removing solvent from the raffinate stream, is described in U.S. Pat. No. 3,470,087 (Class 208–321).

The raffinate stream in line 8 constitutes about 7,888 bbl./day of non-aromatic, heptane-plus material from reforming zone 2 and about 1,504 bbl./day of non-aromatic, hexane-plus hydrocarbons which are introduced into extraction zone 4 via line 5. The total 9,392 bbl./day is processed in I-cracking zone 9 at conversion conditions including a hydrogen/hydrocarbon molal ratio of 6.0:1.0, a pressure of about 750 p.s.i.g., a liquid hourly space velocity of 1.0 and a catalyst bed temperature ranging from 350° F. to 400° F., representing an increasing temperature gradient of 50° F. The catalyst is a composite of alumina, 5.0% by weight of nickel and 7.5% by weight of aluminum chloride sublimed thereon to react with the alumina as aforesaid. A component yield and product distribution are presented in the following Table II:

TABLE II.—I-CRACKING YIELDS AND PRODUCT DISTRIBUTION

| Component | Vol. percent | Bbl./day |
|---|---|---|
| Hydrogen | [1] (1,007) | |
| Methane | [1] 82.5 | |
| Ethane | [1] 16.5 | |
| Propane | 23.1 | 1,823 |
| Isobutane | 72.2 | 5,700 |
| N-butane | 9.5 | 750 |
| Isopentane | 10.5 | 810 |
| N-pentane | 1.8 | 142 |
| Isohexane | 7.0 | 553 |
| N-hexane | 1.4 | 111 |
| Heptane-plus | | 2,738 |

[1] S.c.f./bbl.

The distinct advantages of these particular hydrocracking reactions are readily ascertained from the foregoing Table II. A total of 6,450 bbl./day of butanes are produced, of which about 88.4% by volume are isobutanes. With respect to all the butanes, pentanes and hexanes, of the 8,066 bbl./day, 87.6% by volume are of the isoformation. Of the isohexanes produced, 55 bbl./day constitutes 2,2-dimethylbutane, 63 bbl./day is 2,3-dimethylbutane, 285 bbl./day is 2-methylpentane and there are 15 bbl./day of 3-methylpentane.

The effluent from I-cracking zone 9 passes via line 10 into separation system 11; propane and lighter material is recovered via line 12, a butane concentrate is removed via line 13, isopentane through line 15, n-pentane through line 17, isohexane via line 16 and n-hexane via line 18. The heptane-plus material, in an amount of about 2,738 bbl./day, is removed via line 21, and introduced thereby into secondary reforming zone 6.

Operating conditions in reforming zone 6 include a pressure of about 150 p.s.i.g., a liquid hourly spaced velocity of about 3.2, a hydrogen/hydrocarbon molal ratio of 6.0:1.0 and an average catalyst bed temperature of about 875° F. The catalytic composite constitutes an alumina carrier material containing 0.55% by weight of platinum and 0.25% by weight of rhenium, calculated as if existing as the elements.

The product effluent is introduced into extraction zone 4, via line 5, after removing a hexane-minus stream which is sent to I-cracking zone 9—again, this technique is not illustrated. Yields and product distribution respecting reforming zone 6 effluent are presented in the following Table III:

TABLE III.—REFORMING ZONE 6 EFFLUENT DISTRIBUTION

| Component | Wt. percent | Vol. percent |
|---|---|---|
| Hydrogen | 1.93 | |
| Methane | 0.48 | |
| Ethane | 0.58 | |
| Propane | 0.80 | 1.16 |
| Isobutane | 0.34 | 0.46 |
| N-butane | 0.27 | 0.35 |
| Isopentane | 1.34 | 1.60 |
| N-pentane | 0.48 | 0.58 |
| Hexane-plus | 93.78 | 87.90 |

Aromatic hydrocarbons are recovered from extraction zone 4, through line 7, in a total amount of 13,016 bbl./day; of this, 903 bbl./day stems from the dehydrogenation of the six-membered ring naphthenes produced in I-cracking zone 9. The following Table I summarizes the foregoing which is illustrative of the present inventive concept.

TABLE IV.—OVERALL VOLUMETRIC YIELDS AND PRODUCT DISTRIBUTION

| Component | Vol. percent[1] | Bbl./day |
|---|---|---|
| Propane | 9.21 | 2,253 |
| Isobutane | 24.02 | 5,870 |
| N-butane | 3.60 | 880 |
| Isopentane | 5.74 | 1,402 |
| N-pentane | 1.44 | 353 |
| 2,2-dimethyl butane | 0.23 | 55 |
| 2,3-dimethyl butane | 0.27 | 63 |
| 2-methyl pentane | 1.17 | 285 |
| 3-methyl pentane | 0.62 | 151 |
| N-hexane | 0.45 | 111 |
| Aromatic gasoline | 53.25 | 13,016 |
| Total | 100.00 | 24,439 |

[1] Percent of total product slate.

As indicated in the foregoing Table IV, 75.54% of the fresh feed in line 1 was converted into the desired aromatic hydrocarbons and isobutane concentrate. The aromatic hydrocarbon stream is generally considered to have a clear research octane rating of 115.0 and, when blended with the total pentanes and hexanes, will produce an unleaded gasoline pool of the character shown in Table V. It is understood that the make-up of the gasoline pool will change to the extent that butanes are employed to produce the desired vapor pressure.

TABLE V.—CLEAR GASOLINE POOL, CASE I

| Component | Bbl./day | Vol. percent | Research octane |
|---|---|---|---|
| Isopentane | 1,402 | 9.08 | 93 |
| N-pentane | 353 | 2.29 | 62 |
| 2,2-DiMeBu | 55 | 0.36 | 92 |
| 2,3-DiMeBu | 63 | 0.41 | 104 |
| 2-MePe | 285 | 1.85 | 74 |
| 3-MePe | 151 | 0.98 | 74 |
| N-hexane | 111 | 0.71 | 25 |
| Aromatics | 13,016 | 84.32 | 115 |
| Total | 15,436 | 100.00 | 109.9 |

DESCRIPTION OF A PREFERRED EMBODIMENT

The 2,253 bbl./day of propane can be subjected to dehydrogenation to produce propylene which is then converted via hydrolysis into isopropyl alcohol having a clear research octane rating approximating 110 to 120. This technique will serve to increase both the yield and octane rating of the unleaded gasoline pool. On the other hand, the propylene might be utilized in an alkylation reaction zone for the production of a $C_3$-alkylate stream which has a clear research octane rating of about 92.0.

A preferred embodiment, utilizing the essence of the present invention as above set forth, involves the use of both an alkylation reaction zone and an isomerization zone. In this integrated refinery scheme, the aromatic concentrate from extraction zone 4 is introduced directly, via line 7, into unleaded gasoline pool 26, the propane is withdrawn from the process through line 12 as a by-product stream, isopentane and isohexane are directly introduced into the gasoline pool by way of line 15 and the 464 bbl./day of n-pentane/n-hexane concentrate is introduced into isomerization zone 19 via line 17.

Isomerization zone 19 utilizes a fixed-bed catalytic composite of alumina, 4.0% by weight of aluminum chloride and 0.375% by weight of platinum. Operating conditions include a pressure of about 300 p.s.i.g., a temperature of 330° F. and a hydrogen/hydrocarbon molal ratio of about 1.0:1.0; the reactants transverse the catalyst bed at a liquid hourly space velocity averaging 1.0. Isomeric conversion is about 99.0% efficient, and with the volumetric increase due to molecular size, and conversion of some hexane to isopentane, 359 bbl./day of isopentane, 38 bbl./day of 2,2-dimethyl butane, 12 bbl./day of 2,3-dimethyl butane, 36 bbl./day of 2-methyl pentane and 21 bbl./day of 3-methyl pentane are introduced, by way of line 20, into separation system 11 for recovery and ultimate introduction into gasoline pool 26 via line 15.

As indicated in the drawing, the butane stream in line 13 may be processed in dehydrogenation zone 14 in order to produce the olefins which are introduced via line 22 into alkylation zone 23 to produce a $C_4$-alkylate having an octane rating of 97.0. In the present situation, sufficient olefins are available from a fluid catalytic cracking unit and, therefore, the butane concentrate is introduced directly into alkylation zone 23. The 5,870 bbl./day of isobutane requires 5,111 bbl./day of outside butylenes to produce 9,044 bbl./day of $C_4$-alkylate which is sent to clear gasoline pool 26 by way of line 24. The reaction time, utilizing a pumped acid settlor/reactor system, is about nine minutes, and the acid to hydrocarbon ratio, using hydrofluoric acid, is 1.5:1.0. Alkylation reactions are effected at a temperature of about 100° F. and a pressure of about 20 atmospheres.

One preferred technique constitutes introducing the 880 bbl./day of normal butane into isomerization zone 19 via line 25, for conversion into additional isobutane which is subsequently alkylated in alkylation zone 23. At a conversion efficiency of 99.0%, and with the volumetric increase due to molecular size, an additional 904 bbl./day of isobutane becomes available. Thus, the 6,774 bbl./day of isobutane will require 5,890 bbl./day of outside butylenes to produce 10,430 bbl./day of $C_4$-alkylate.

The unleaded gasoline pool, including all the $C_4$-alkylate, has the characteristics shown in the following Table VI.

TABLE IV.—CLEAR GASOLINE POOL, CASE II

| Component | Bbl./day | Vol. percent | Research octane |
|---|---|---|---|
| Isopentane | 1,761 | 6.81 | 93 |
| 2,2-DiMeBu | 93 | 0.36 | 92 |
| 2,3-DiMeBu | 75 | 0.29 | 104 |
| 2-MePe | 321 | 1.24 | 74 |
| 3-MePe | 172 | 0.66 | 74 |
| Aromatics | 13,016 | 50.32 | 115 |
| C⁴ Alkylate | 10,430 | 40.32 | 97 |
| Total | 25,868 | 100.00 | 105.3 |

Based upon the 25,000 bbl./day of fresh feed charge stock and the additional 5,890 bbl./day of outside butylenes, the volumetric yield of the unleaded gasoline pool, having a clear octane rating of 105.3, is 83.7%.

The foregoing demonstrates the method by which the present invention is effected and the benefits afforded through the utilization thereof.

I claim as my invention:

1. A process for the simultaneous production of an aromatic concentrate and an isobutane concentrate, from a naphtha boiling range charge stock, which comprises the steps of:
   (a) reacting said charge stock in a first catalytic reforming reaction zone, at reforming conditions selected to convert naphthenic hydrocarbons to aromatic hydrocarbons;
   (b) separating the resulting first reformed product effluent, in a first separation zone, to recover said aromatic concentrate and to provide a saturated normally liquid stream containing 5-membered ring naphthenes;
   (c) reacting at least a portion of said normally liquid stream with hydrogen in a hydro-cracking reaction zone, at hydrocracking conditions selected to convert 5-membered ring naphthenes to 6-membered ring naphthenes and to produce isobutane, and in contact with a hydrocracking catalytic composite of a Group VIII noble metal component, or a nickel component, and the reaction product of alumina and a sublimed Friedel-Crafts metal halide;
   (d) separating the resulting hydrocracked product effluent, in a second separation zone, to recover said isobutane and to provide a heptane-plus stream containing said 6-membered ring naphthenes;
   (e) reacting said heptane-plus stream in a second catalytic reforming zone, at a lower operating severity than in said first catalytic reforming zone to convert said 6-membered ring naphthenes to aromatic hydrocarbons; and, (f) separating the resulting second reformed product effluent in said second separation zone to recover said aromatic hydrocarbons.

2. The process of claim 1 further characterized in that said first and second reformed product effluents are separated in a solvent extraction zone.

3. The process of claim 1 further characterized in that said hydrocracking conditions include a maximum catalyst bed temperature in the range of from 300° F. to about 480° F., a liquid hourly space velocity from 1.0 to about 10.0, a hydrogen concentration of 3,000 to 20,000 s.c.f./bbl. and a pressure from 500 to about 2,000 p.s.i.g.

4. The process of claim 1 further characterized in that said hydrocracking catalytic composite comprises from about 0.1% to about 2.0% by weight of a platinum or palladium component.

5. The process of claim 1 further characterized in that said hydrocracking catalytic composite comprises from about 1.0% to about 10.0% by weight of a nickel component.

6. The process of claim 1 further characterized in that said Friedel-Crafts metal halide is an aluminum halide.

7. The process of claim 1 further characterized in that said first and second reformed product effluents are separated to provide a normal pentane/hexane concentrate, said concentrate being reacted with hydrogen in a hydroisomerization reaction zone at isomerizing conditions selected to produce pentane and hexane isomers.

8. A process for producing a high octane, unleaded gasoline pool which comprises the steps of:

(a) reacting a naphtha boiling range charge stock in a first catalytic reforming reaction zone, at reforming conditions selected to convert naphthenic hydrocarbons to aromatic hydrocarbons;

(b) separating the resulting first reformed product effluent to provide (1) a normal pentane/hexane concentrate, (2) a first heptane-plus normally liquid stream containing 5-membered ring naphthenes and to recover aromatic hydrocarbons;

(c) reacting at least a portion of said first heptane-plus stream with hydrogen in a hydrocracking reaction zone, at hydrocracking conditions selected to convert 5-membered ring naphthenes to 6-membered ring naphthenes and to produce isobutane, and in contact with a hydrocracking catalytic composite of a Group VIII noble metal component, or a nickel component, and the reaction product of alumina and a sublimed Friedel-Crafts metal halide;

(d) separating the resulting hydrocracked product effluent to recover an isobutane concentrate and to provide a second heptane-plus stream containing 6-membered ring naphthenes;

(e) reacting said second heptane-plus stream in a second catalytic reforming reaction zone, at a lower operating severity than in said first catalytic reforming zone to convert 6-membered ring naphthenes to aromatic hydrocarbons;

(f) reacting said normal pentane/hexane concentrate in a hydroisomerization reaction zone at isomerizing conditions selected to produce pentane and hexane isomers;

(g) alkylating said isobutane concentrate with an olefinic hydrocarbon, in an alkylation reaction zone at alkylating conditions selected to produce a normally liquid alkylated hydrocarbon stream; and, (h) recovering said aromatic hydrocarbons, said pentane and hexane isomers and said alkylated hydrocarbon stream as said high octane, unleaded gasoline pool.

9. The process of claim 8 further characterized in that at least a portion of said isobutane concentrate is reacted in a dehydrogenation reaction zone, at dehydrogenating conditions selected to produce butenes and reacting said butenes in said alkylation reaction zone as said olefinic hydrocarbon.

10. The process of claim 8 further characterized in that the reformed effluent from said second catalytic reforming reaction zone is separated to recover said aromatic hydrocarbons and to provide a normal pentane/hexane concentrate, and reacting said pentane/hexane concentrate in said hydroisomerization reaction zone.

References Cited

UNITED STATES PATENTS

| | | | |
|---|---|---|---|
| 3,172,841 | 3/1965 | Paterson | 208—80 |
| 3,172,842 | 3/1965 | Paterson | 208—80 |
| 3,175,966 | 3/1965 | Burch | 208—80 |
| 3,409,540 | 11/1968 | Gould et al. | 208—80 |
| 3,650,943 | 3/1972 | Schuller | 208—79 |
| 3,658,690 | 4/1972 | Graven | 208—79 |
| 3,702,292 | 11/1972 | Burich | 208—80 |

HERBERT LEVINE, Primary Examiner

U.S. Cl. X.R.

208—17, 65, 80, 117